Figure 1:
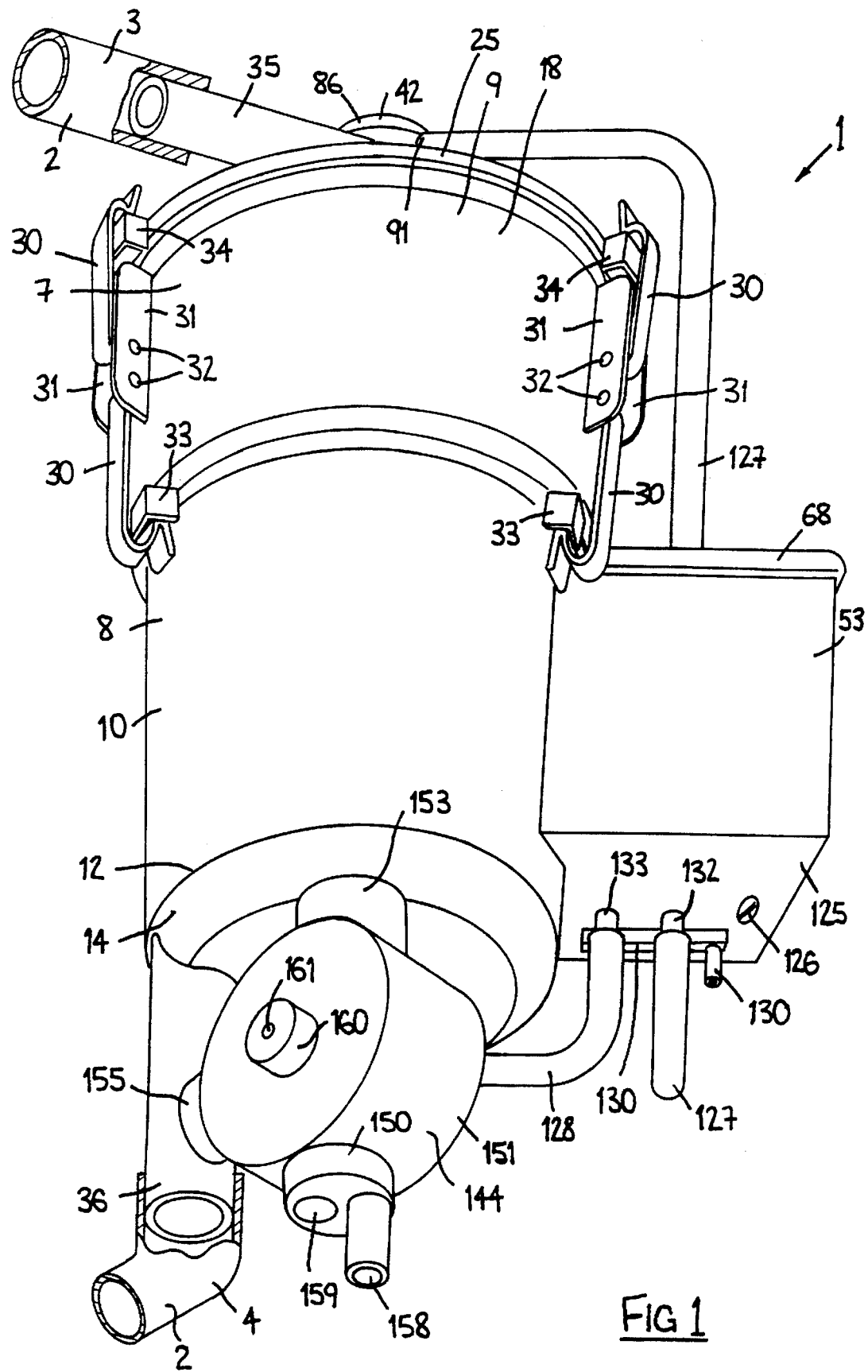

United States Patent [19]
Harty et al.

[11] Patent Number: 5,632,411
[45] Date of Patent: May 27, 1997

[54] METER AND A METHOD FOR MEASURING QUANTITY OF A FLOWING LIQUID

[75] Inventors: Edmond P. Harty; Edmond P. Harty, Jr., both of Causeway; Edmond O'Callaghan, Kilworth, all of Ireland

[73] Assignee: Dewvale Limited, Tralee, Ireland

[21] Appl. No.: 360,659

[22] PCT Filed: Jun. 17, 1993

[86] PCT No.: PCT/IE93/00034

§ 371 Date: Dec. 19, 1994

§ 102(e) Date: Dec. 19, 1994

[87] PCT Pub. No.: WO93/25871

PCT Pub. Date: Dec. 23, 1993

[30] Foreign Application Priority Data

Jun. 17, 1992 [IE] Ireland ..................... 921950
Jul. 1, 1992 [IE] Ireland ..................... 922142

[51] Int. Cl.$^6$ ..................................... B67B 7/00
[52] U.S. Cl. ..................... 222/1; 222/55; 222/40
[58] Field of Search ................. 222/1, 55, 644, 222/148, 40

[56] References Cited

FOREIGN PATENT DOCUMENTS 0146630 11/1984 European Pat. Off. .
0297329 1/1989 European Pat. Off. .
3404581 8/1985 Germany .

Primary Examiner—Gregory L. Huson
Attorney, Agent, or Firm—Sughrue, Mion, Zinn, Macpeak & Seas

[57] ABSTRACT

A meter for measuring the quantity of milk by weight flowing in a pipeline comprises a main housing having a main milk inlet pipe and a main milk outlet pipe. A buffer chamber in the main housing receives and holds the milk prior to weighing. A weighing container in a weighing chamber sequentially receives discrete quantities of milk from the buffer chamber through a communicating opening. The weighing container is mounted on a load cell, which sequentially weighs the settled weights of the discrete quantities of milk, the settled weights of which are cumulatively stored. Weighed milk is discharged from the weighing container through a discharge outlet opening. A main valve member and a secondary valve member selectively close the communicating opening and the discharge outlet, respectfully. Milk samples are collected in a milk sample reservoir on discharge of weighed discrete quantities of milk from the weighing container for subsequent collection in a collection jar.

23 Claims, 11 Drawing Sheets

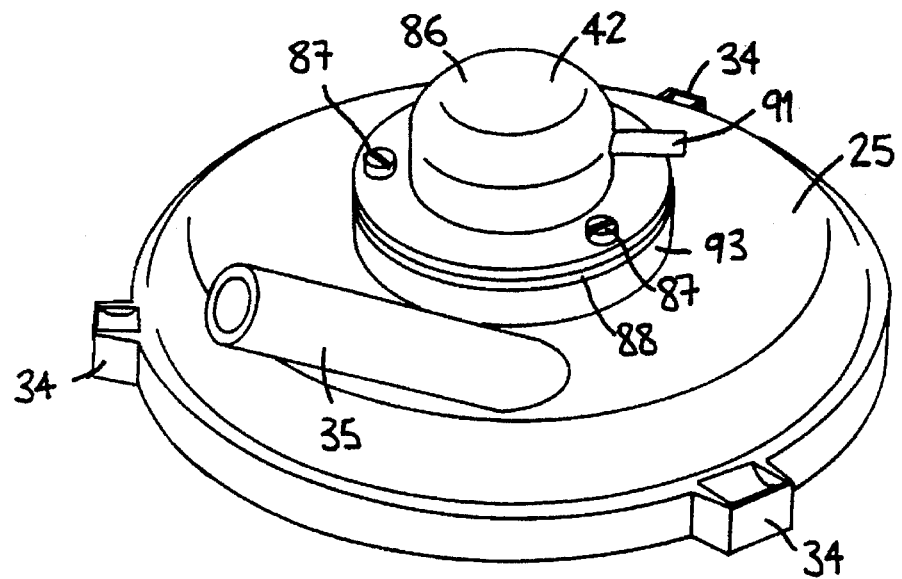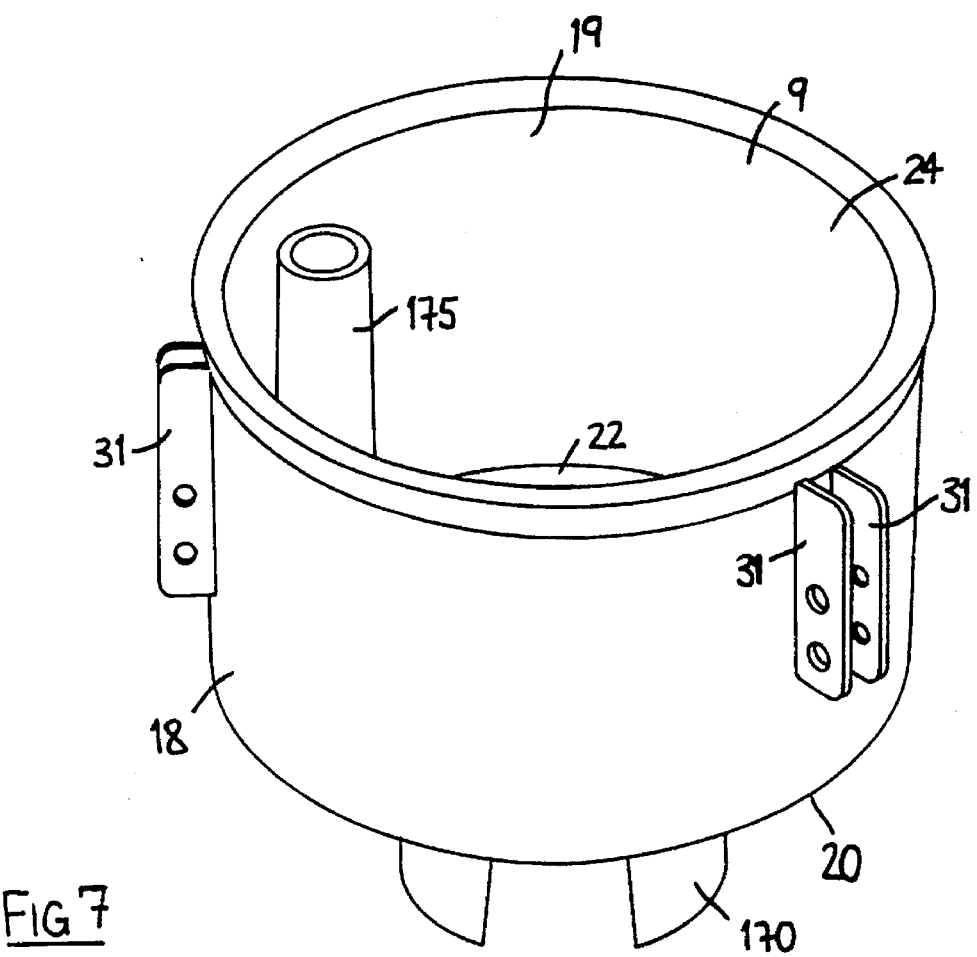
FIG 7

METER AND A METHOD FOR MEASURING QUANTITY OF A FLOWING LIQUID

The present invention relates to a meter and a method for measuring the quantity by weight of a flowing liquid, and in particular, for measuring the quantity by weight of a liquid flowing through a pipeline.

In many instances it is desirable to measure a quantity of liquid flowing through a pipeline. For example, it is desirable to measure the quantity of milk flowing through a milk pipeline between a cluster of milking teats and a milk holding vacuum jar so that a farmer can monitor the milk output of each cow. In intensive milk production farms, it is essential for a farmer to know the milk output of each animal. Meters for measuring the quantity of milk and other liquids flowing in a pipeline are known. Typically, such meters measure the volume of liquid flowing in the pipeline. A typical type of such meter is an impeller type meter which comprises an impeller disposed in the liquid flow which is rotatable by the flowing liquid. The number of rotations of the impeller are counted for determining the quantity of the liquid flowing through the pipeline. Such impeller type meters are reasonably accurate for determining the quantity of liquid flow in cases where the liquid is of uniform density throughout and does not tend to froth or foam. However, such meters are unsuitable for measuring the quantity of milk flowing in a pipeline. Milk flowing through a pipeline between the cluster of milking teats and the vacuum holding jar contains a considerable amount of entrained air, and furthermore, the quantity of entrained air is not uniform. Additionally, the density of milk varies considerably during a milking cycle of a cow. Initially, at the beginning of a milking cycle, the milk tends to comprise a relatively high proportion of water, while towards the end of the milking cycle the milk tends to have a considerably higher proportion of fat. Furthermore, there is a considerable tendency for the milk to froth and foam, which further leads to inaccuracies in measuring the quantity of milk flowing in the pipeline. Accordingly, such impeller type meters are unsuitable for measuring the quantity of milk milked from a cow. An alternative construction of meter comprises a container of known volume which is placed in the path of the flowing milk. On the milk reaching a predetermined level in the container, the milk is discharged from the container which is again filled. However, because of the quantity of entrained air, froth, foaming of the milk and to a lesser extent the variation in density of the milk, such meters likewise are inaccurate and unreliable.

British Patent Specification No. 2,113,856A discloses a meter for measuring quantity of milk flowing in a pipeline by weight. In this meter, milk is delivered into a compensating vessel and in turn into a weighing container. The weight of the milk in the container is determined during a period while milk is accumulating in the container. The container is then emptied at a rate much greater than the maximum supply rate of milk into the weighing container so that the level of milk in the weighing container falls. The cycle repeats. Series of weight values each representing one accumulation period are fed to a computer which interpolates values for the intervening emptying periods. This meter, while it does determine the quantity of milk flowing in a pipeline by weight, is likewise inaccurate in that it relies on estimates being made of the milk delivered into the weighing container during the emptying period.

There is therefore a need for a meter which measures the quantity by weight of a liquid flowing in a pipeline more accurately than prior art devices. In certain cases, there is also the need for such a meter which is suitable for taking a representative sample of all the liquid being weighed. For example it is desirable that a representative sample of milk being milked from a cow should include samples of milk over substantially the entire milking cycle.

It is an object of the invention to provide a meter and a method for measuring the quantity by weight of a flowing liquid, and in particular a liquid flowing in a pipeline. It is a particular object of the invention to provide a meter and a method for measuring the quantity by weight of a flowing liquid where the liquid is susceptible to frothing and foaming and the liquid is of variable density. It is a secondary object of the invention to provide such a meter and method which also provides for sampling of the liquid.

According to the invention, there is provided a meter for measuring the quantity by weight of a flowing liquid, the meter comprising a housing defining a buffer chamber for receiving and holding the liquid to be weighed, a main inlet means being provided into the buffer chamber for the liquid, weighing means for sequentially weighing discrete quantities of the liquid, first communicating means communicating the buffer chamber with the weighing means for delivering the liquid into the weighing means, main valve means co-operating with the first communicating means for selectively closing the first communicating means for isolating the weighing means from the buffer chamber after each discrete quantity of liquid has been delivered into the weighing means, a discharge outlet means from the weighing means for delivering the weighed discrete quantities of liquid from the weighing means, and secondary valve means co-operating with the discharge outlet means for closing the discharge outlet means and for selectively opening the discharge outlet means after each discrete quantity of liquid in the weighing means has been weighed.

The advantages of the invention are many. By virtue of the fact that the quantity is determined by weight, and all liquid flowing is weighed in discrete quantities, an accurate measurement of the quantity of liquid flowing is obtained. The measured quantity is unaffected by variation in the consistency and/or the density of the liquid. The measured quantity is also unaffected by the inclusion of entrained air and the like in the liquid or by frothing or foaming. The provision of the buffer chamber accommodates accumulation of liquid while each discrete quantity of the liquid is being weighed.

In one embodiment of the invention, the main valve means is responsive to the weighing means for closing the first communicating means on the weighing means determining that the approximate weight of the liquid in the weighing means is equal to a predetermined weight. This feature of the invention provides a particularly important advantage in that the meter with this feature is suitable for dealing efficiently with liquids flowing over the full range of flow rates from zero flow rate up to the maximum capacity of the meter without the risk of liquid overflowing from, overloading or being lost from the weighing means. It will be appreciated that the maximum flow rate with which the meter can cope will depend essentially on the capacity of the weighing means and the cycle time required for weighing each discrete quantity of liquid. By virtue of the fact that the main valve means is responsive to the weighing means, the main valve means closes on the weighing means determining that the weight of the discrete quantity of liquid in the weighing means is substantially equal to the predetermined weight. This, thus, avoids any danger or risk of a greater quantity of liquid than that with which the weighing means can cope being delivered to the weighing means.

Additionally, in the event of relatively low flow rates, the main valve means remains open until the discrete quantity of liquid in the weighing means is substantially equal to the predetermined weight.

In another embodiment of the invention, the secondary valve means is responsive to the weighing means for opening the discharge outlet means on the weighing means having determined a substantially steady state weight of each discrete quantity of liquid in the weighing means.

The advantage of this feature of the invention is that the measured weight of each discrete quantity of liquid is particularly accurate.

In another embodiment of the invention, the main valve means is responsive to the secondary valve means for opening the first communicating means on the secondary valve means having closed the discharge outlet means.

The advantage of this feature of the invention is that it ensures that all liquid flowing through the meter is weighed.

Advantageously, the apparatus comprises a timing means. Preferably, the secondary valve means is responsive to the timing means for closing the discharge outlet means on the timing means having timed a predetermined discharge time period after the secondary valve means has opened the discharge outlet means.

The advantage of this feature of the invention is that it ensures that double weighing of the liquid passing through the meter does not occur.

In a further embodiment of the invention, the main valve means is responsive to the timing means for opening the first communicating means on the timing means having timed a predetermined delay time period after the secondary valve means has closed the discharge outlet means.

The advantage of this feature of the invention is that it provides for relatively accurate measuring of the liquid.

In one embodiment of the invention, the weighing means is responsive to the timing means for determining the steady state weight of each discrete quantity of liquid in the weighing means on the timing means having timed a predetermined settling time period after the weighing means has determined the approximate weight of liquid in the weighing means being equal to the predetermined weight. The advantage of this feature of the invention is that it provides a relatively accurate meter.

Preferably, the housing defines a weighing chamber, the weighing chamber communicating with the buffer chamber through the first communicating means, the weighing means being mounted in the weighing chamber, and a main outlet means being provided from the weighing chamber for delivering weighed liquid therefrom, the main outlet means communicating with the discharge outlet means.

The advantage of this feature of the invention is that it facilitates connecting the meter to a pipeline.

In one embodiment of the invention, the weighing means comprises a weighing container defining a hollow interior region for receiving the liquid through an open mouth, and for holding the liquid during weighing, the weighing container being mounted on the housing by a load cell for weighing the liquid.

The advantage of this feature of the invention is that it provides a convenient construction of meter and also provides a relatively accurate meter.

Preferably, the load cell comprises a shear beam load cell.

The advantage of providing a shear beam load cell is that it facilitates accurate weighing of the discrete quantities of the liquid, and furthermore, in general, the weights recorded by the load cell are unaffected by the distance of the centre of gravity of the weighing container and liquid combined from the load cell.

Preferably, the load cell is mounted horizontally, and a substantially horizontal carrier shaft extends centrally from the load cell for carrying the weighing container.

The advantage of this feature of the invention is that it provides a convenient construction and accurate meter.

Preferably, the carrier shaft extends from a side wall of the weighing container. Advantageously, the load cell is mounted externally of the housing, the carrier shaft extending through the housing and being sealably engaged therein.

In another embodiment of the invention, the buffer chamber is provided above the weighing means for accommodating liquid flow through the first communicating means under gravity.

The advantage of this feature of the invention is that it provides for a convenient and effective construction of meter.

In a preferred embodiment of the invention, the main valve means comprises a main valving member co-operating with the first communicating means and being movable between an open position with the buffer chamber and weighing means communicating and a closed position isolating the buffer chamber from the weighing means. Preferably, a main actuating means is provided for moving the main valving member between the closed position and the open position. Advantageously, the main actuating means comprises a vacuum operated main diaphragm actuator, the main diaphragm actuator being arranged for urging the main valving member into the open position under vacuum. Preferably, main biasing means is provided for urging the main valving member into the closed position.

The advantage of these features of the invention is that it provides for a relatively convenient and robust construction of meter, and also provides for a relatively accurate meter.

In another embodiment of the invention, the secondary valve means comprises a secondary valving member co-operating with the discharge outlet means, the secondary valving member being movable between an open position with the discharge outlet means open to a closed position with the discharge outlet means closed. Preferably, a secondary actuating means is provided for moving the secondary valving member between the open and closed positions, and an operating member operably connects the secondary actuating means with the secondary valving member, the operating member being disengagable with the secondary valving member on the secondary valving member being in the closed position. Advantageously, the secondary actuating means comprises a vacuum operated secondary diaphragm actuator, the vacuum operated secondary diaphragm actuator being arranged for operating the secondary valving member into the closed position on a vacuum being applied. In one embodiment of the invention, first secondary biasing means is provided for urging the secondary valving member into the closed position. Advantageously, second secondary biasing means is provided for urging the secondary valving member into the open position.

The advantage of these features of the invention is that it provides for a relatively convenient and robust construction of meter, which is also relatively accurate.

In one embodiment of the invention, a baffle means is provided in the first communicating means for minimizing the effect of the liquid flowing into the weighing means on the weighing means.

In another embodiment of the invention, a control means is provided for controlling the operation of the meter, the control means comprising monitoring means for reading the output of the weighing means, weight storing means for cumulatively storing the steady state weights of the discrete quantities of liquid read by the monitoring means.

In one embodiment of the invention., the control means comprises the timing means, and activating means for activating the operation of the main and secondary valve means. Preferably, the activating means comprises respective main and secondary solenoid valves for applying a vacuum to the respective main and secondary actuating means.

In another embodiment of the invention, second communicating means is provided for communicating the buffer chamber with the weighing means for maintaining the buffer chamber and weighing means at substantially the same pressure, the second communicating means being located to avoid flow of liquid through the second communicating means from the buffer chamber to the weighing means during normal operation of the meter. Preferably, second communicating means communicates the buffer chamber and the weighing chamber.

Preferably, sampling means is provided for collecting a liquid sample each time a weighed discrete quantity of liquid is discharged from the weighing means, and a liquid sample storing means is provided for storing the liquid samples. Advantageously, agitating means is provided for agitating the liquid samples in the liquid sample storing means. Preferably, the agitating means is operable on movement of the secondary valve means. In one embodiment of the invention, overflow means is provided from the liquid sample storing means, the overflow means communicating with the main outlet means.

In a further embodiment of the invention, a secondary outlet means is provided from the liquid sample storing means, and receiving means for releasably receiving a collecting vessel for collecting a liquid sample is provided, an outlet valve means selectively communicating the receiving means with the secondary outlet means for delivering liquid samples from the liquid sample storing means to the collecting vessel, and the outlet valve means selectively communicating the main outlet means with the secondary outlet means.

Preferably, the outlet valve means is a three position valve means having a first position in which the receiving means is connected to the secondary outlet means and the main outlet means for applying a vacuum on the receiving means for drawing milk samples from the milk sample reservoir into the collecting vessel mounted on the receiving means, a second position in which the secondary outlet means is connected to the main outlet means for drawing milk samples into the main outlet means, and a third position in which the secondary outlet means and the main outlet means are respectively closed and isolated from the receiving means and from each other.

In one embodiment of the invention, the sampling means and liquid sample storing means are provided in the weighing chamber.

In a further embodiment of the invention, the meter is adapted for connecting into a pipeline in which the liquid is flowing so that all the liquid flowing in the pipeline flows through the meter, the main inlet means being adapted for connecting to an upstream portion of the pipeline, and the main outlet means being adapted for connecting into a downstream portion of the pipeline. Preferably, the main housing is airtight for maintaining a vacuum applied to the pipeline and for maintaining the said vacuum in the housing. In one embodiment of the invention, the meter is suitable for measuring the quantity of milk by weight flowing in a pipeline.

Preferably, the meter is suitable for connecting into a milk pipeline delivering milk from a milking cluster to a milk holding vacuum jar.

Additionally, the invention provides a method for measuring the quantity by weight of a flowing liquid, the method comprising the steps of feeding the liquid into a buffer chamber, sequentially delivering discrete quantities of the liquid from the buffer chamber into a weighing means, isolating the weighing means from the buffer chamber after each discrete quantity of liquid has been delivered into the weighing means, sequentially determining the weight of the discrete quantities of liquid in the weighing means, and discharging the weighed discrete quantities of liquid from the weighing means. Preferably, the weighing means is isolated from the buffer chamber on the weighing means having determined that the approximate weight of liquid in the weighing means is equal to a predetermined weight.

Advantageously, the weighing means determines a substantially steady state weight of each discrete quantity of liquid.

The advantages provided by the method according to the invention are substantially similar to the advantages provided by the meter according to the invention.

In one embodiment of the invention, the method further comprises the step of taking a sample of each weighed discrete quantity of liquid as the discrete quantities of liquid are being discharged from the weighing means.

Preferably, the samples are stored and agitated for subsequent collection. In one embodiment of the invention, the weighed liquid is discharged from the weighing means through a discharge outlet means. Preferably, the discharge outlet means is closed after a predetermined discharge time period has elapsed from the time the discharge outlet means is open for discharging each weighed discrete quantity of liquid from the weighing means. Advantageously, the buffer chamber communicates with the weighing means through a first communicating means and a main valve means is provided in the first communicating means for selectively closing the first communicating means for isolating the buffer chamber from the weighing means and the method includes the step of timing a predetermined delay time period after the discharge outlet means has been closed before the first communicating means is open.

Figure 2:
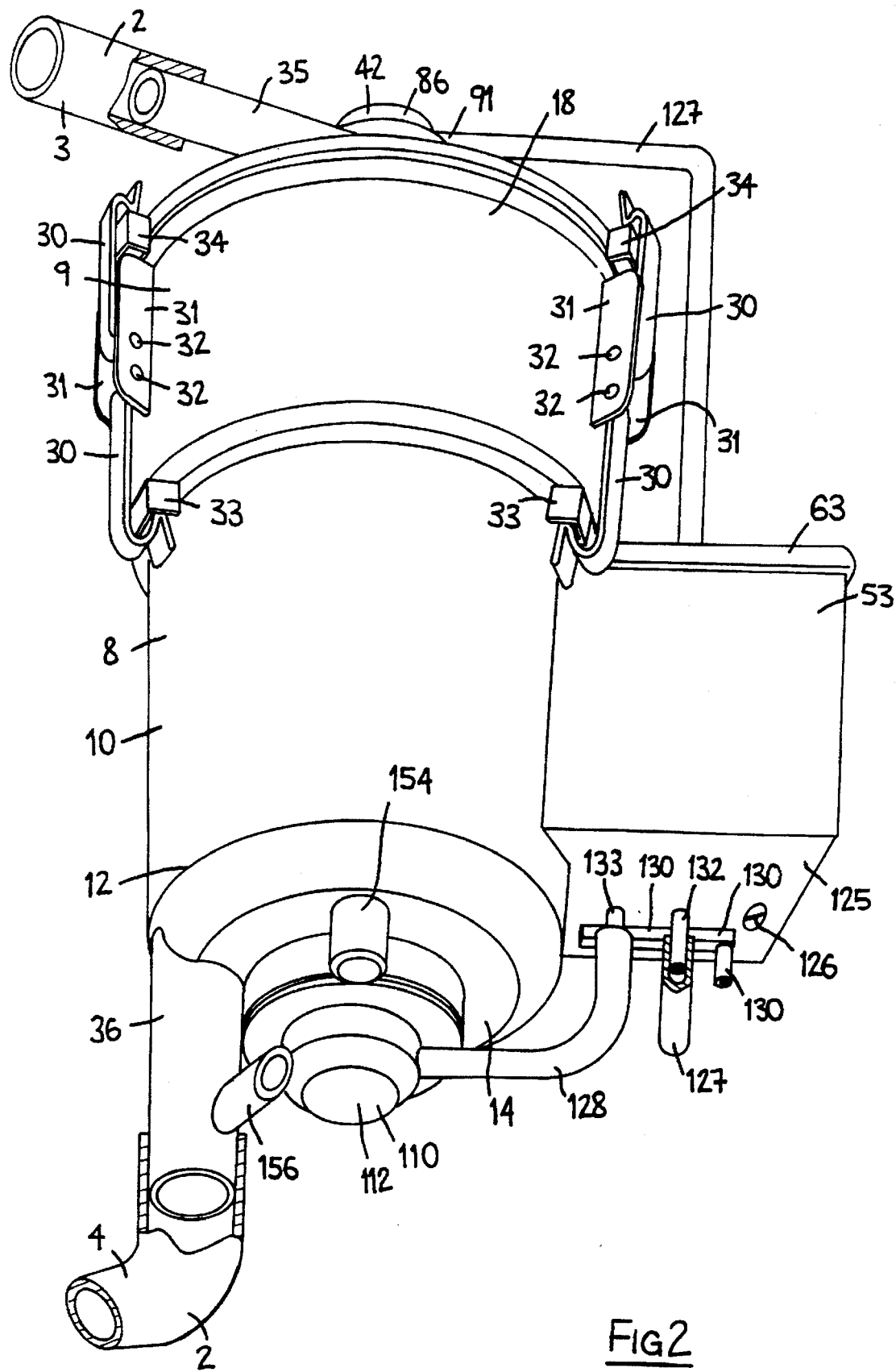
Figure 3:
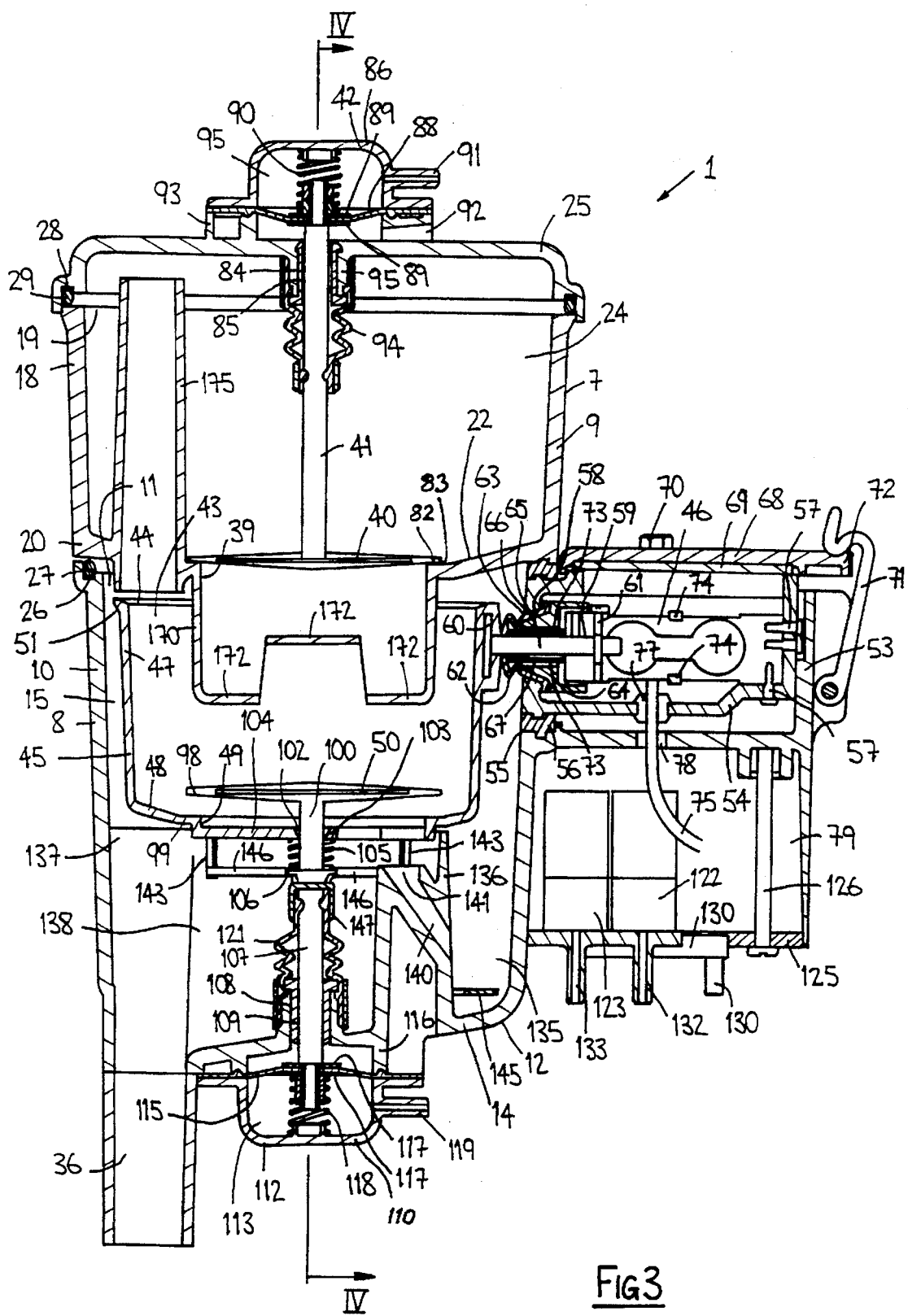
Figure 4:
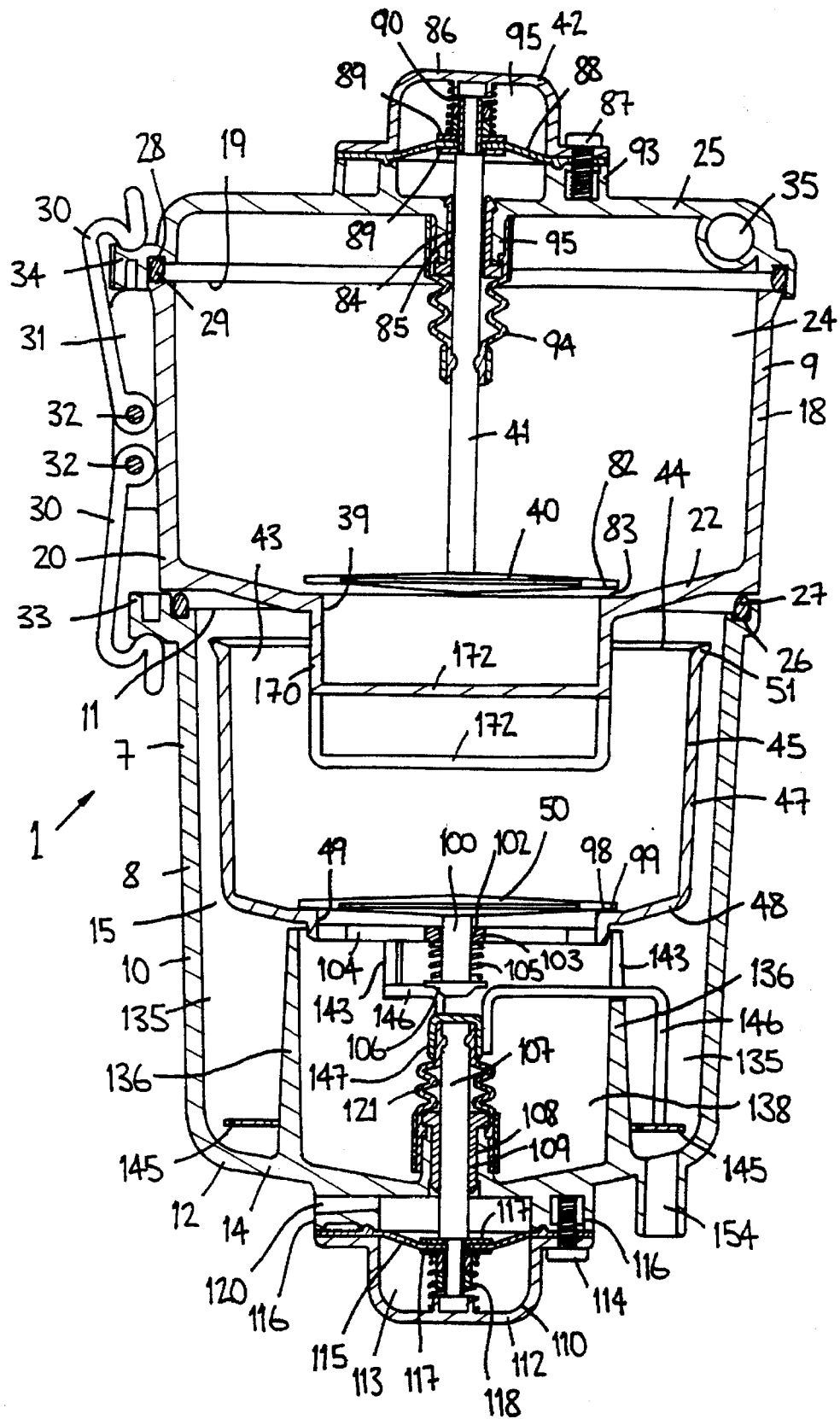
Figure 5:
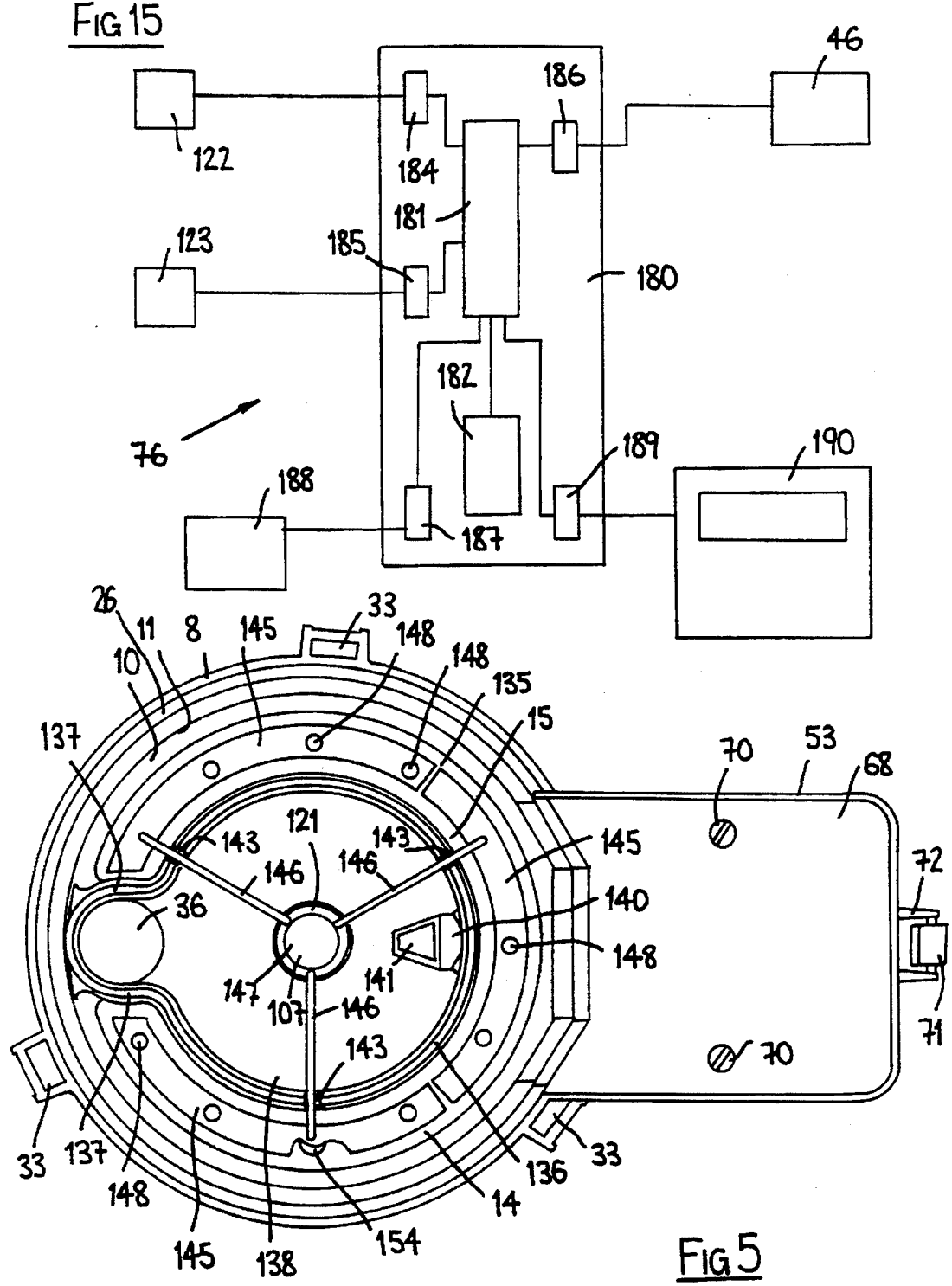
Figure 6:
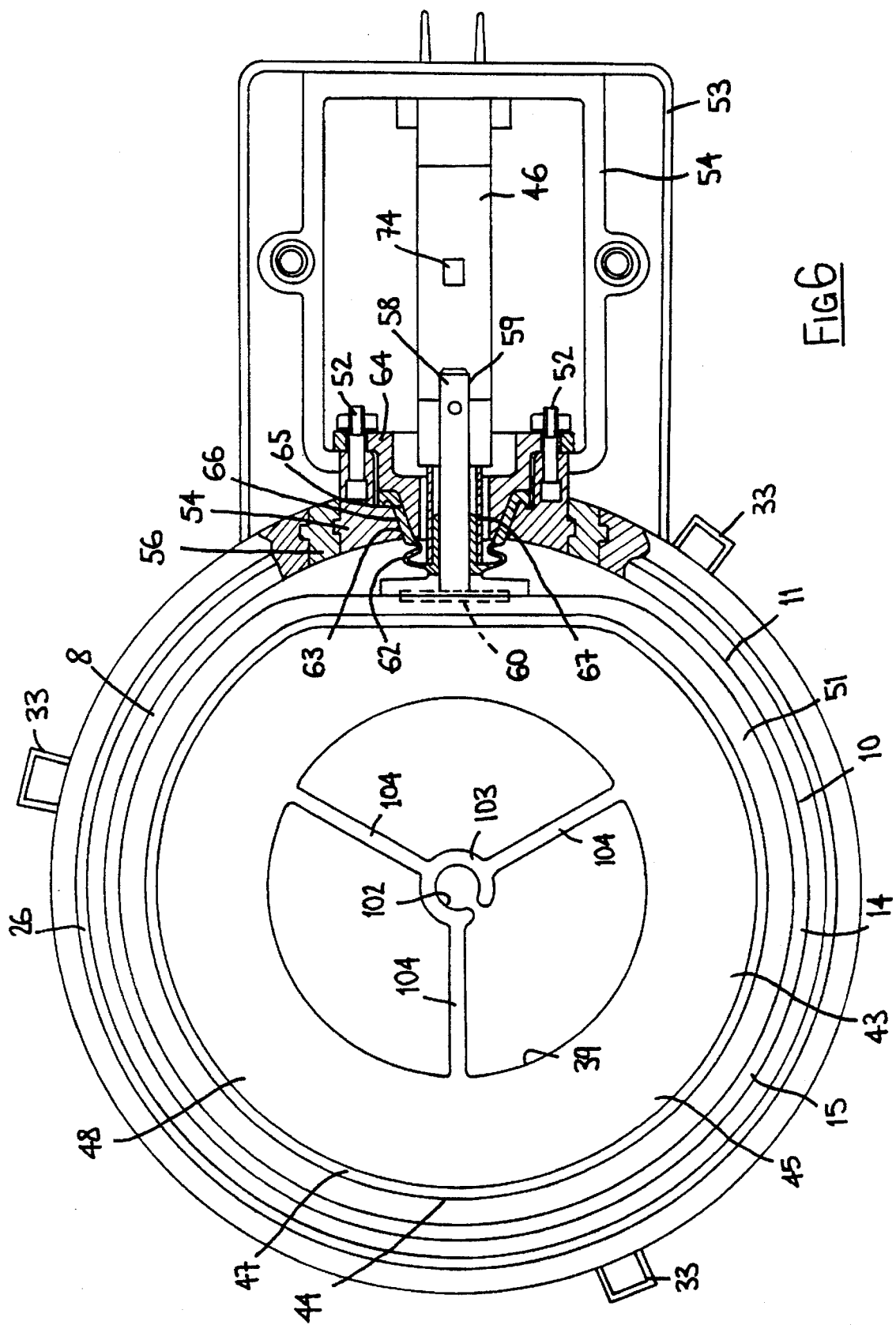
Figure 11:
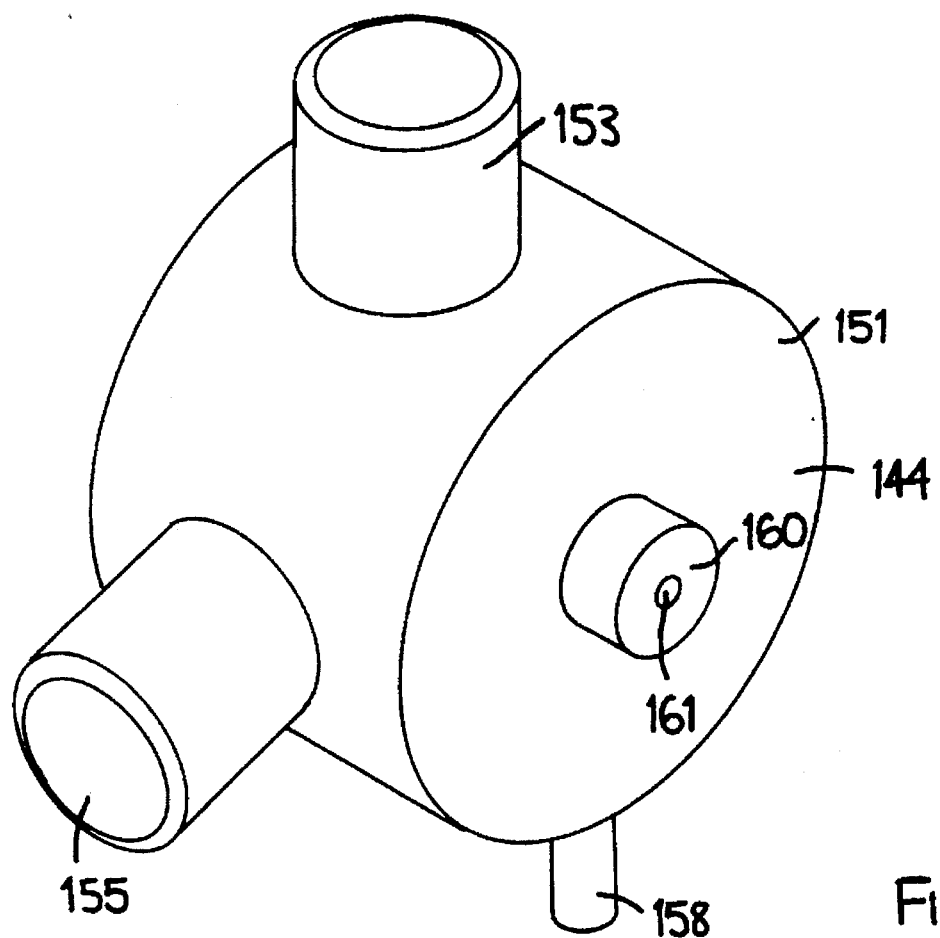
Figure 8:
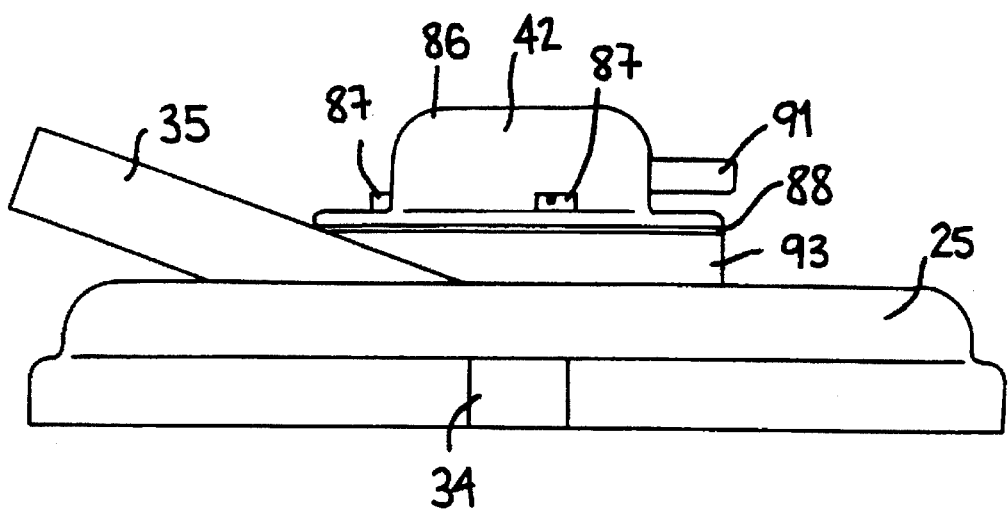
Figure 10:
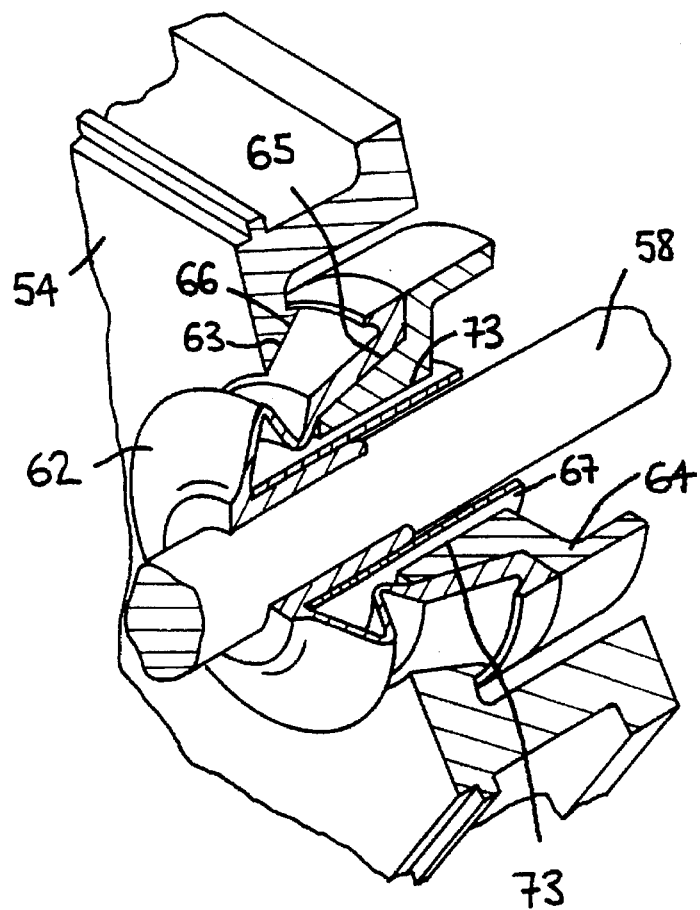
Figure 9:
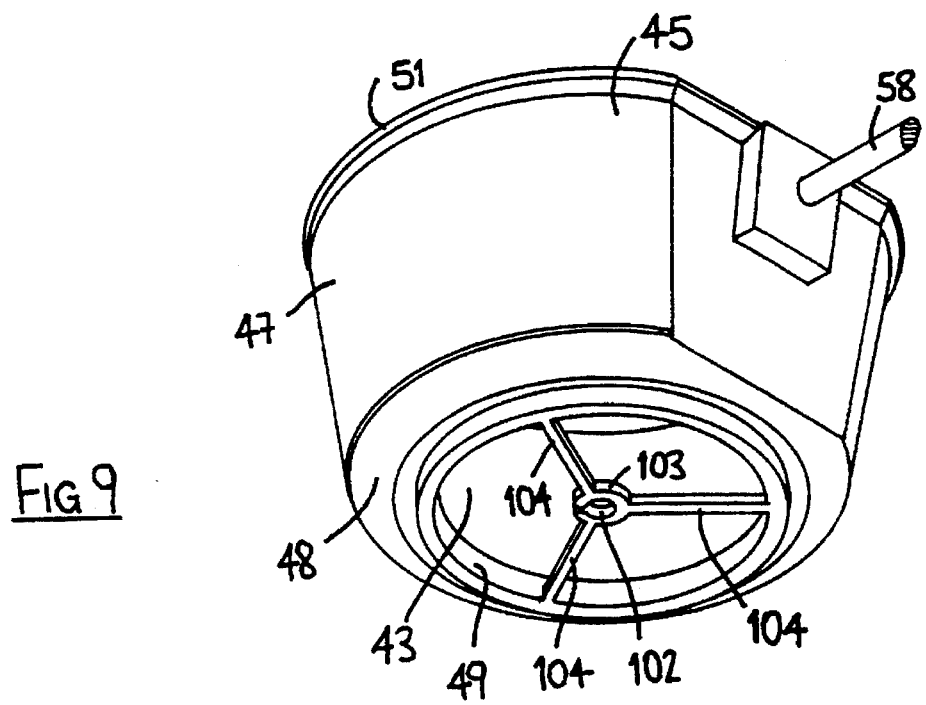
Figure 13:
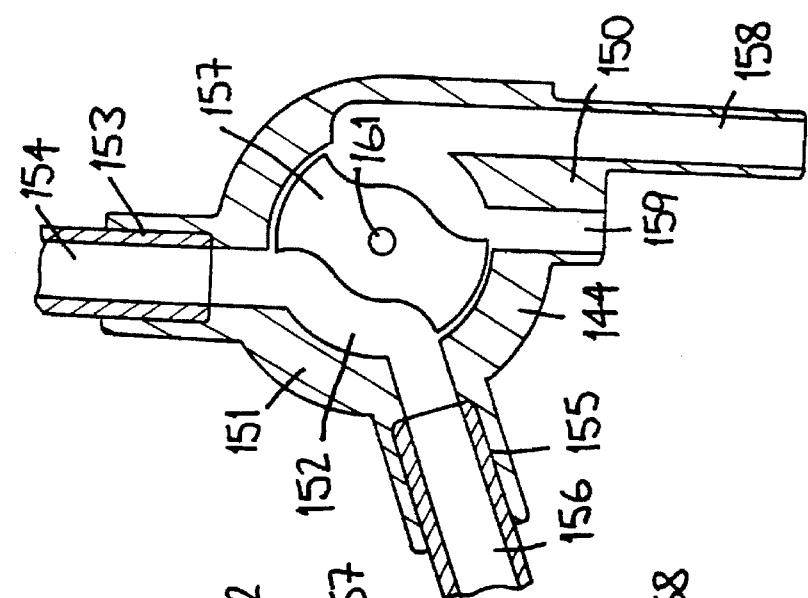
Figure 12:
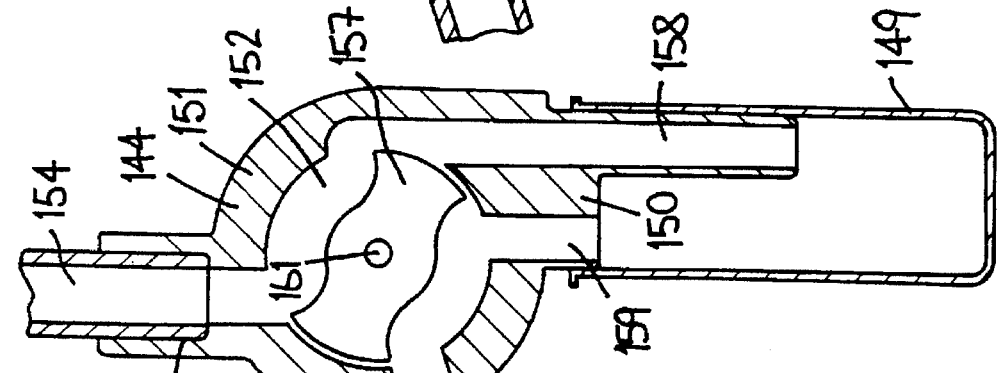
Figure 14:
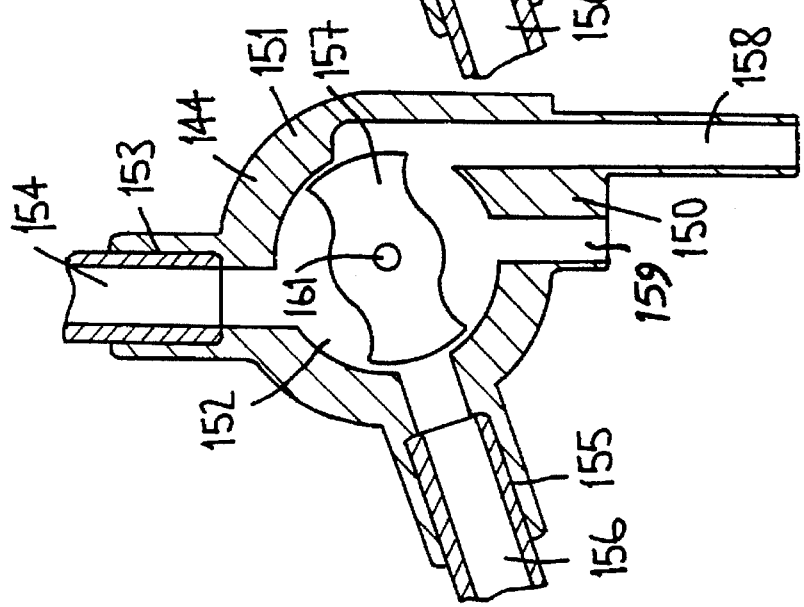
Figure 16:
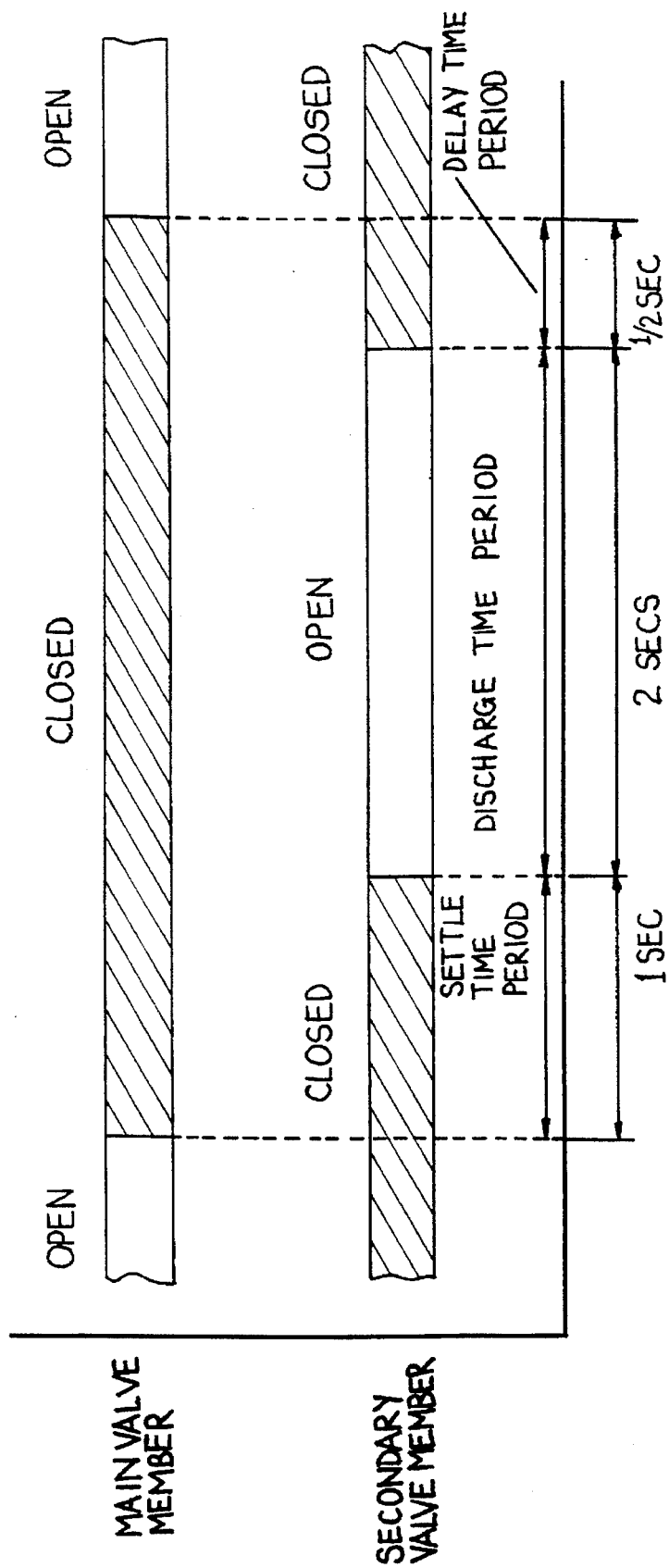

The invention will be more clearly understood from the following description of a preferred embodiment thereof given by way of example only with reference to the accompanying drawings, in which:

FIG. 1 is a perspective view of a meter according to the invention for measuring the quantity by weight of a flowing liquid, FIG. 2 is a perspective view of the meter of FIG. 1 with portion of the meter removed, FIG. 3 is a cross sectional elevational view of the meter of FIG. 1, FIG. 4 is a cross sectional elevational view of the meter of FIG. 1 on the line IV—IV of FIG. 3, FIG. 5 is a plan view of portion of the meter of FIG. 1, FIG. 6 is another plan view of the portion of FIG. 5 showing part of the portion in section, FIG. 7 is an exploded perspective view of another portion of the meter of FIG. 1, FIG. 8 is an elevational view of part of the portion of FIG. 7, FIG. 9 is an underneath perspective view of another portion of the meter of FIG. 1, FIG. 10 is a cut-away perspective view of a detail of the meter of FIG. 1, FIG. 11 is a perspective view of another portion of the meter of FIG. 1, FIG. 12 is a sectional elevational view of the portion of the meter of FIG. 11, FIG. 13 is a view similar to FIG. 12 of the portion in a different position, FIG. 14 is a view similar to FIG. 12 of the portion in a still further different position, FIG. 15 is a block representation of a circuit diagram of the meter of FIG. 1, and FIG. 16 is a timing diagram showing the operation of parts of the meter of FIG. 1.

Referring to the drawings, there is illustrated a meter 1 according to the invention indicated generally by the reference numeral 1 for measuring quantity by weight of a liquid flowing in a pipeline. The meter 1 is particularly suitable for measuring quantity of milk by weight flowing in a pipeline 2 which extends between a cluster of milking teats and a vacuum milk holding jar, neither of which are shown, for determining the quantity by weight of milk milked from a cow. Only portion of the pipeline 2 is illustrated, namely, an upstream portion 3 which communicates with the cluster of milking teats, and a downstream portion 4 which communicates with the vacuum milk holding jar. The meter 1 comprises a main housing 7 of injection moulded transparent plastics material. The main housing 7 comprises two parts, namely, a lower housing 8 and an upper housing 9 of substantially cylindrical construction which are axially aligned with each other one above the other. The lower housing 8 comprises an elongated lower cylindrical side wall 10 open at one end 11 and closed at the other end 12 by a base 14 integrally formed with the side wall 10. The lower side wall 10 and base 14 form a weighing chamber 15 where the milk is weighed as will be described below.

The upper housing 9 comprises an elongated upper cylindrical side wall 18 which is open at one end 19 and closed at the other end 20 by a base 22 integrally formed with the upper side wall 18. An end cap 25 of injection moulded plastics material closes the open end 19 of the upper housing 9 and forms with the upper side wall 18 and base 22 a buffer chamber 24 for receiving and holding milk to be weighed. The base 22 of the upper housing 9 closes the open end 11 of the lower housing 8 to form with the lower side wall 10 and base 14 the weighing chamber 15.

An annular groove 26 extending around the lower side wall 10 adjacent the open end 11 carries an O-ring seal 27 for sealably engaging the base 22 of the upper housing 9 to maintain an airtight seal. A groove 28 in the end cap 25 carries an O-ring seal 29 for sealably engaging the upper side wall 18 for forming an airtight seal between the end cap 25 and the upper housing 9.

The lower housing 8, the upper housing 9 and the end cap 25 are retained together in sealable engagement by three pairs of clips 30 of resilient stainless steel. The pairs of clips 30 are pivotally mounted on mounting members 31 integrally moulded with the upper housing 9 and disposed at intervals of 120° around the upper side wall 18. Pivot pins 32 carry the clips 30 which engage corresponding receivers 33 and 34 which are integrally moulded with the lower housing 8 and end cap 25, respectively. The receivers 33 and 34 are disposed at intervals of 120° around the lower housing 8 and end cap 25, respectively.

A main inlet means, namely, a main inlet pipe 35 extends from the end cap 25 for communicating the upstream portion 3 of the pipeline 2 with the buffer chamber 24. A main outlet means, namely, a main outlet pipe 36 extends from the base 14 of the lower housing 8 for delivering weighed milk from the weighing chamber 15 into the downstream portion 4 of the pipeline 2.

First communicating means formed by a communicating opening 39 in the base 22 of the upper housing 9 communicates the weighing chamber 15 with the buffer chamber 24 so that milk in the buffer chamber 24 flows under gravity into the weighing chamber 15. A main valve means, namely, a main valving member 40 selectively closes the communicating opening 39 for isolating the weighing chamber 15 from the buffer chamber 24 during weighing of the milk as will be described below. The main valving member is carried on a main spindle 41 and is operated by an actuating means, namely, a vacuum operated main diaphragm actuator 42 mounted in the end cap 25 as will be described below.

Weighing means for sequentially weighing discrete quantities of milk of predetermined size comprises a weighing container 45 mounted in the weighing chamber 15 by a load cell 46 as will be described below. The weighing container 45 is of injection moulded plastics material and comprises a cylindrical side wall 47 extending upwardly from a base 48 and terminating in an outwardly directed lip 51. The base 48 and the side wall 47 define a hollow interior region 43 for receiving the discrete quantities of milk. The lip 51 forms an upwardly directed open mouth 44 for receiving milk from the communicating opening 39 into the hollow interior region 43 of the weighing container 45. A discharge outlet means is formed in the base 48 by a discharge outlet opening 49 for discharging the weighed discrete quantities of milk from the weighing container 45 into the weighing chamber 15 and in turn through the main outlet pipe 36. A secondary valve means comprising a secondary valving member 50 closes the discharge outlet 49, and selectively opens the discharge outlet 49 for discharging the weighed discrete quantities of milk after weighing. The secondary valving member 50 will be described in more detail below.

A secondary housing 53 formed integrally with the lower housing 8 and extending sidewardly therefrom houses the load cell 46. In this embodiment of the invention, the load cell 46 is a shear beam load cell and is mounted in a carrier housing 54 of plastics material located in the secondary housing 53. The carrier housing 54 engages a mounting opening 55 formed in the side wall 10 of the lower housing 8. A resilient sealing member 56 extends around the carrier housing 54 in the mounting opening 55 for sealably and resiliently securing the carrier housing 54 in the side wall 10. Three screws 57 secure the load cell 46 in the carrier housing 54. A carrier shaft 58 carried in a bore 59 in the load cell 46 extends from the load cell 46 through the carrier housing 54 to the weighing chamber 15 for carrying the weighing container 45. A head 60 on the carrier shaft 58 is retained captive in the side wall 47 of the weighing container 45 by virtue of it being insert moulded into the weighing container 45 during injection moulding of the weighing container 45. The bore 59 is co-axially formed in the load cell 46 so that the carrier shaft 58 is in turn co-axial with the load cell 46. In this way, an accurate reading of the weight of the discrete quantities of milk in the weighing container 45 is obtained. A screw 61 in the load cell 46 retains the carrier shaft 58 in the load cell 46. A sealing arrangement which comprises a bellows seal 62 around the carrier shaft 58 forms an airtight seal between the weighing chamber 15 and the secondary housing 53. The bellows seal 62 tightly and sealably engages the carrier shaft 58 and is sealably engaged in a circular opening 63 through the carrier housing 54 which accommodates the carrier shaft 58. A retaining ring 64 having a fusto-conical outer surface 65 sealably secures the bellows seal 62 against a correspondingly shaped surface 66 in the opening 63. Screws 52 retain the retaining ring 64 in engagement with the bellows seal 62 in the opening 63. A stainless steel sleeve 67 extending along the carrier shaft 58 between the weighing container 45 and the load cell 46 urges the bellows seal 62 into tight sealing engagement with the weighing container 45 to further enhance the formation of an airtight seal between the weighing chamber 15 and the secondary housing 53. A bore 73, see FIGS. 3 and 10, through the retaining ring 64 accommodates the carrier shaft 58 and the sleeve 67 through the retaining ring 64. The bore 73 is of sufficiently large diameter to provide good clearance between the sleeve 67 and the retaining ring 64 to facilitate sufficient vertical movement of the carrier shaft 58 relative to the housing to enable the weighing container 45 and the contents therein to induce a strain in the load cell 46 for weighing of the weighing container 45. A lid 68 closes the carrier housing 54 and a sealing gasket 69 is disposed between the lid 68 and the carrier housing 54. Screws 70 secure the lid 68 to the secondary housing 53 and a clip 71 similar to the clips 30 which is pivotally connected to the secondary housing 53 and engagable with a receiver 72 of the lid 68 further secures the lid 68 to the carrier housing 54.

Strain gauges 74 mounted on the top and bottom faces of the load cell 46 are connected by electrical cables 75 to a control means, namely, a control circuit 76 described below for monitoring of the load cell 46. A grommet 77 accommodates the cables 75 through the carrier housing 54. An opening 78 in the secondary housing 53 accommodates the cables 75 into a lower compartment 79 of the secondary housing 53 within which the control circuit 76 is housed.

By virtue of the fact that the load cell 46 is a shear beam load cell, provided the carrier shaft 58 is co-axial with the load cell 46, the weight recorded by the load cell 46 will be the accurate weight of each discrete quantity of milk in the weighing container 45 allowing for the weight of the weighing container 45 irrespective of the distance of the weighing container 45 or the distance of the combined centre of gravity of the weighing container 45 and milk contained therein from the load cell.

Turning now to the main valving member 40, the main valving member 40 is provided with a peripheral valving face 82 which sealably engages a valve seat 83 extending around the periphery of the communicating opening 39. The main spindle 41 is located in a bushing 85 in a bore 84 extending through the end cap 25. The spindle 41 is axially slidable in the bushing 85 for moving the valving member 40 between an open position (see FIG. 4) spaced apart from the valve seat 83 with the weighing chamber 15 and buffer chamber 24 communicating, and a closed position (see FIG. 3) with the valve face 82 sealably engaging the valve seat 83 for isolating the weighing chamber 15 from the buffer chamber 24 after each discrete quantity of milk has been delivered into the weighing container 45. The main diaphragm actuator 42 for operating the main valving member 40 comprises a main actuator housing 86 which is secured by three screws 87 to the end cap 25. A diaphragm 88 sandwiched between the main actuator housing 86 and the end cap 25 is secured to the main spindle 41 by a pair of mounting discs 89 fast on the main spindle 41. The diaphragm 88 and the main actuator housing 86 form a vacuum cavity 95. Main biasing means comprising a main compression spring 90 acting between the main actuator housing 86 and the mounting discs 89 urge the main spindle 41 downwardly, and in turn, the main valving member 40 into the closed position. A vacuum is applied to the vacuum cavity 95 through a vacuum port 91 of the main actuator housing 86 for urging the main spindle 41 upwardly and in turn the main valving member 40 into the open position. An exhaust port 92 through a portion 93 of the end cap 25 maintains the pressure on the side of the diaphragm 88 opposite the vacuum at atmospheric pressure. A bellows seal 94 tightly and sealably engages the main spindle 41 and a portion 95 of the end cap 25 forming the bore 84 for ensuring an airtight seal between the buffer chamber 24 and the main actuator housing 86.

Turning now to the secondary valving member 50, the secondary valving member 50 is provided with a peripheral valve face 98 for sealably engaging a valve seat 99 extending around the discharge outlet opening 49. A secondary spindle 100 extends downwardly from the secondary valving member 50 and is slidably located in a carrier bore 102 formed in a carrier 103 centrally located in the discharge outlet opening 49, and which is carried on three mounting members 104 extending inwardly from the periphery of the discharge outlet opening 49. First secondary biasing means comprising a first compression spring 105 acting between the carrier 103 and a flange 106 extending around the secondary spindle 100 urges the secondary valving member 50 into a closed position (see FIG. 4) with the valve face 98 sealably engaging the valve seat 99 for closing the discharge outlet opening 49. An operating member 107 for urging the secondary valving member 50 into an open position (see FIG. 3) with the valve face 98 disengaged from the valve seat 99 for opening the discharge outlet opening 49 is centrally and slidably located in a bore 108 in the base 14 of the lower housing 8. A bushing 109 in the bore 108 slidably engages the operating member 107. A secondary actuating means, in this case, a vacuum operated secondary diaphragm actuator 110 operates the operating member 109. The secondary actuator 110 comprises a secondary actuator housing 112 which is secured by three screws 114 to the base 14 of the lower housing 8. A diaphragm 115 is sandwiched between the secondary actuator housing 112 and a portion 116 of the base 14 and is secured to the operating member 107 by a pair of mounting discs 117 fast on the operating member 107. The diaphragm 115 and the secondary actuator housing 112 form a vacuum cavity 113. Second secondary biasing means comprising a second compression spring 118 acting between the secondary actuator housing 112 and one of the mounting discs 117 urges the operating member 107 into engagement with the secondary spindle 100 for in turn urging the secondary valving member 50 into the open position. A vacuum is applied to the vacuum cavity 113 through a vacuum port 119 in the secondary actuator housing 112 for urging the operating member 107 out of engagement with the secondary spindle 100 for permitting the secondary valving member 50 to close under the action of the first spring 105. An exhaust port 120 through the portion 116 of the base 14 maintains the side of the diaphragm 115 opposite the vacuum side of the diaphragm 115 at atmospheric pressure. A bellows seal 121 tightly and sealably engages the operating member 107 and a portion of the base 14 forming the bore 108 for ensuring an airtight seal between the weighing chamber 15 and the secondary actuator housing 112.

Activating means for activating and controlling the operation of the main valving member 40 and the secondary valving member 50 by applying a vacuum to the respective main and secondary actuators 42 and 110 comprises a pair of solenoid operated valves, namely, a main solenoid valve 122 and a secondary solenoid valve 123, respectively. The main and secondary solenoid valves 122 and 123 are mounted in the lower compartment 79 of the secondary housing 53. The solenoid valves 122 and 123 are mounted on a base plate 125 which is secured by screws, one screw 126 of which is illustrated. A vacuum supply is supplied to inlets (not shown) of the valves 122 and 123 through an inlet vacuum line 130. Outlets 132 and 133 from the solenoid valves 122 and 123, respectively, are connected by pipes 127 and 128, respectively, to the vacuum ports 91 and 119 of the main and secondary actuators 42 and 110, respectively, for operating the main spindle 41 and operating member 107, respectively. The control circuit 76 described below controls the operation of the solenoid valves 122 and 123 in an operation sequence which is also described below.

Liquid sample storing means for storing a plurality of samples of milk collected each time a weighed discrete quantity of milk is discharged from the weighing container 45 comprises a milk sample reservoir 135 of partly annular shape extending around the bottom portion of the weighing chamber 15. The reservoir 135 is formed by an inner wall 136 which extends upwardly from the base 14 of the lower housing 8 spaced apart from the side wall 10. Portions 137 of the inner wall 136 extend radially outwardly towards and engage the side wall 10 adjacent the main outlet pipe 36 for isolating the milk sample reservoir 135 from the main outlet pipe 36. As well as forming the milk sample reservoir 135, the inner wall 136 also forms a delivery chamber 138 into which weighed milk is discharged from the weighing container 45 for delivery through the main outlet pipe 36. Sampling means for drawing off a sample of milk each time a weighed discrete quantity of milk is discharged from the weighing container 45 comprises a sampling tube 140 extending from the inner wall 136 into the delivery chamber 138. The sample tube 140 communicates with the milk sample reservoir 135 at one end and terminates at the other end in an upwardly directed opening 141 for receiving milk samples as the weighed quantity is discharged from the weighing container 45. Overflow means, namely, three overflow slots 143 located in the inner wall 136 at 120° intervals extend downwardly into the inner wall 136 to facilitate overflow of excessive quantities of milk samples collected in the milk sample reservoir 135 into the delivery chamber 138. Agitating means for agitating and mixing the milk samples collected in the reservoir 135 comprises three arcuate agitating paddles 145, each of which are carried on a respective paddle carrier 146. The paddle carriers 146 are mounted on and extend radially outwardly from a carrier cap 147 at 120° intervals around the operating member 107. The carrier cap is secured on the operating member 107 over the bellows seal 121. The agitator paddles 145 are of substantially equal length and are arranged so that the paddles extend consecutively around the reservoir 135. The paddle carriers 146 are accommodated in the overflow slots 143 and are movable upwardly and downwardly for in turn moving the agitator paddles 145 upwardly and downwardly on upward and downward movement of the operating member 107 each time the secondary valving member 50 is operated for agitating and mixing the milk samples in the reservoir 135. A plurality of holes 148 are provided through each agitator paddle 145 for enhancing the mixing and agitating action of the agitator paddles 145.

Receiving means for receiving a milk sample collecting vessel, namely, a collection jar 149 for collecting a milk sample from the milk sample reservoir 135 comprises a receiving spigot 150 formed on a valve housing 151 of a three position outlet valve 149, which is mounted beneath the lower housing 8. The outlet valve 144 is provided with four ports; a first port 153 which is connected to and engaged with a secondary outlet means, namely, a secondary outlet 154 from the milk sample reservoir 135 for delivering the milk sample to the outlet valve 144; a second port 155 for connection to and engagement with a branch tube 156 extending from the main outlet pipe 36. A third port 158 which terminates in the receiving spigot 150 delivers the milk sample into the collection jar 149. A fourth port 159 which also terminates in the receiving spigot 150 draws a vacuum on the collection jar for urging the milk sample into the collection jar 149. The valve housing 151 defines a hollow cylindrical valving chamber 152 which communicates the ports 153, 155, 158 and 159. A three position valving member 157 is rotatably mounted in the valving chamber 152.

The valving member 157 is manually movable between and into the three positions by a knob 160 which is rigidly mounted on a shaft 161 extending from the valving member 157. In a first position illustrated in FIG. 12, the valving member 157 communicates the first and third ports 153 and 158, respectively, and the second and fourth ports 155 and 159, respectively. In this first position, when a collection jar 149 is sealably engaged on the receiving spigot 150, a vacuum is applied to the collection jar 149 for drawing the milk sample from the milk sample reservoir 135 into the collection jar 149. In a second position illustrated in FIG. 13, the valving member 157 communicates the first port 153 and the second port 155 for drawing any remaining milk sample in the milk sample reservoir 135 into the main outlet pipe 36 after a desired quantity of the milk sample has been collected in the collection jar 149. In the third position illustrated in FIG. 14, the valving member 157 closes the first and second ports 153 and 155. This would be the normal position of the outlet valve 144 while the meter 1 is weighing the milk and collecting the samples.

The receiving spigot 150 is sized to correspond with the inner dimensions of the neck of the collection jar 149 so that the collection jar 149 can be releasably and sealably engaged on the spigot 150 in an airtight manner. It will be appreciated that the receiving spigot 150 will only receive collection jars with appropriately dimensioned necks. Needless to say, if desired, an adaptor may be provided for adapting the spigot 150 for receiving jars of different size necks.

A tubular member 170 of circular cross-section extends downwardly from the base 22 of the upper housing 9 into the weighing chamber 15 for delivering milk from the communicating opening 39 into the weighing container 45. Three baffles 172 extend transversely across the tubular member 170 for minimizing the effect of the milk falling under gravity into the weighing container 45 on the load cell 46.

A second communicating means for communicating the buffer compartment 24 with the weighing compartment 15 for maintaining a vacuum applied to the main outlet pipe 36 in the buffer compartment 24, for, in turn, maintaining vacuum continuity between the upstream portion 3 and the downstream portion 4 of the pipeline 2 comprises a communicating pipe 175 extending upwardly from the base 22 of the upper housing 9 into the buffer chamber 24. The communicating pipe 175 extends to a position adjacent the end cap 25 to avoid any danger of milk overflowing through the communicating pipe 175 from the buffer chamber 24 into the weighing chamber 15 during normal operation of the meter 1. The communicating pipe 175 has a second function during flushing out of the meter with a cleaning fluid as will be described below.

As can be seen in FIGS. 1, 2 and 7, the main inlet pipe 35 is inclined and is arranged in the end cap 25 to direct the milk circumferentially and downwardly into the buffer chamber 24 to minimize frothing of the milk in the buffer chamber 24.

Referring now to FIG. 15, the control circuit 76 for controlling the operation of the meter will now be described.

The control circuit comprises a printed circuit board 180 on which a microprocessor 181 for controlling the operation of the meter is mounted. A timer 182 is also mounted on the printed circuit board 180 for timing part of the operating sequence of the main and secondary valving members 40 and 50 as will be described with reference to FIG. 16, and for timing the weighing means as will also be described below. A pair of drivers 184 and 185 mounted on the printed circuit board 180 operate the solenoid valves 122 and 123 respectively, under the control of the microprocessor 181. An analog to digital converter 186 mounted on the printed circuit board delivers signals from the strain gauges 74 of the load cell 46 to the microprocessor 181. An input terminal 187 is provided on the printed circuit board 180 for connection of an input device 188, for example, a keyboard or the like to enable a farmer to key in the identity of a cow being milked, which can subsequently be correlated in the microprocessor 181 with the measured quantity of milk, and also for keying in other commands to the microprocessor 181. An output terminal 189 is provided on the printed circuit board 180 for facilitating connection of an output device, for example, a visual display and printer unit 190 for enabling the recorded measured quantity of milk and the identity of the cow to be displayed and/or printed. Other suitable electronic components which may be required and will be well known to those skilled in the art will be also be provided on the printed circuit board 180.

A weighing cycle of the meter for weighing one discrete quantity of milk will now be described.

Under vacuum from the downstream portion 4 of the pipeline 2, milk from the upstream portion 3 of the pipeline 2 is continuously fed into the buffer chamber 24. With the secondary valving member 50 closing the discharge outlet opening 49 of the weighing container 45, and the main valving member 40 open, milk in the buffer chamber 24 flows under gravity into the weighing container 45, in which a discrete quantity of milk collects. The microprocessor 181 under the control of suitable software acts as a monitoring means and reads the load cell 46 while the milk is flowing into the weighing container 45. On the load cell 46 recording a predetermined weight equivalent to a weight of approximately 500 grammes of milk in the weighing container 45, the main valving member 40 is immediately closed by operating the solenoid valve 122 to apply a vacuum on the vacuum port 91 of the main diaphragm actuator 42. The secondary valving member 50 is retained closed, and the microprocessor immediately activates the timer 182 to time a predetermined settling time period of one second to enable the discrete quantity of milk in the weighing container 45 and the weighing container 45 to settle, see FIG. 16. After the timer has timed the settling time period, the microprocessor 181 again reads the load cell and records the weight read from the load cell 46 which is the settled weight of the discrete quantity of milk allowing for the weight of the weighing container 45. The read recorded weight is stored. The weight read from the load cell 46 after the settling time period allowing for the weight of the weighing container 45 is a relatively accurate weight of the discrete quantity of milk in the weighing container 45. On the microprocessor 181 having read the settled weight from the load cell 46, the solenoid 123 is operated to release the vacuum on the vacuum port 119 of the secondary actuator 110 for opening the secondary valving member 50, for in turn, discharging the weighed discrete quantity of milk from the weighing container 45 into the delivery chamber 138, and in turn, through the main outlet pipe 36 into the downstream portion 4 of the pipeline 2. As the weighed discrete quantity of milk is being discharged through the discharge outlet opening 49, a sample of the milk is collected in the milk sample reservoir 135. Simultaneously with operating the secondary actuator 110 for opening the secondary valving member 50 the microprocessor operates the timer 182 for timing a predetermined discharge time period of two seconds during which the secondary valving member 50 is retained in the open position for the discharge of the weighed discrete quantity of milk from the weighing container 45 under gravity, see FIG. 16. On the timer 182 having timed the discharge time period, the solenoid 123 is operated by the microprocessor 181 for in turn operating the secondary actuator 110 for closing the secondary valving member 50. The timer 182 times a further time period, namely, a predetermined delay time period of half a second after which the microprocessor 181 operates the solenoid valve 122 for operating the main actuator 42 for opening the main valving member 40, see FIG. 16. The next discrete quantity of milk flows under gravity from the buffer chamber 24 into the weighing container 45 and the next weighing cycle commences. At the end of each weighing cycle, the recorded settled weights of the discrete quantities of milk read by the microprocessor 181 are cumulatively stored in a suitable weight storing means in the microprocessor 181 so that on milking of a cow having been completed, the total weight of milk milked from the cow can be displayed and/or printed and recorded against the identity of the animal. The total weight of milk is the summation of the settled weights of the discrete quantities of milk.

During operation of the meter 1, while the meter 1 is sequentially weighing the discrete quantities of milk, the outlet valve 144 is in the third position and isolates the secondary outlet 154 and the main outlet pipe 36 from the receiving spigot 150. In other words, the valving member 157 of the outlet valve 144 is in the third position illustrated in FIG. 14.

When the cow has been milked, and it is desired to collect a sample of the milk samples in the milk sample reservoir 135, a collection jar 149 is engaged on the receiving spigot 150. The valving member 157 is urged by the knob 160 into the first position illustrated in FIG. 12 whereby the first and third ports 153 and 158 and second and fourth ports 155 and 159 communicate for drawing the milk sample into the collection jar 149. When a desired quantity of milk sample has been collected in the collection jar 149, the valving member 157 is urged by the knob 160 into the second position (FIG. 13) whereby the secondary outlet 154 is connected to the main outlet pipe 36 for drawing the remaining milk sample in the milk sample reservoir 135 into the main outlet pipe 36. On the milk sample reservoir 135 having been emptied, the valving member 157 is urged into the third position (FIG. 14) by the knob 160.

After the last of the quantities of milk which have been milked from a cow has been weighed and cumulatively stored in the microprocessor 181, the cumulative weight of milk cross-referenced with the identity of the cow is saved in the microprocessor 181 for further use. Appropriate commands are then inputted into the microprocessor 181 through the keyboard 188 for resetting the microprocessor to commence weighing milk from the next cow. The identity of the cow is also keyed into the microprocessor 181 through the keyboard 188 for subsequent cross-referencing and saving with the weight of the milk.

The microprocessor 181 is also programmed to operate the meter 1 during a washing and flushing cycle. In other words, the meter 1 is operated in such a way that all parts of the meter 1 which come into contact with milk can be flushed out during washing and flushing out of the milk line.

The operation of the meter 1 during a washing cycle will now be described. The main valving member 40 and the secondary valving member 50 are both closed. Flushing liquid being flushed through the pipeline 2 is delivered into the buffer chamber 24 through the main inlet pipe 35. The flushing liquid accumulates in the buffer chamber 24 until it reaches the level of the top of the communicating pipe 175 at which stage the flushing liquid flows through the communicating pipe 175 into the weighing container 45. The flushing liquid then accumulates in the weighing container 45 and overflows over the lip 51 of the weighing container 45 into the milk sampling reservoir 35 in the weighing chamber 15. The flushing liquid then overflows through the overflow slots 143 in the inner wall 136, and in turn, through the delivery chamber 138 and through the main outlet pipe 36. The flushing liquid then flows through the downstream portion 4 of the pipeline 2. As can be seen in FIG. 3, the communicating pipe 175 is provided over the weighing container 45 so that the flushing liquid flows directly into the weighing chamber 45. The lip 51 of the weighing container 45 is also positioned so that the flushing liquid overflowing from the weighing container 45 flows into and collects in the milk sample reservoir 135. In general, the rate at which the flushing liquid is delivered through the meter 1 will be such as to ensure that the weighing chamber 15 will be substantially filled with flushing liquid for cleaning thereof.

After the flushing liquid has been passed through the meter 1 for an appropriate period of time to ensure thorough washing and flushing of the meter, the main valving member 40 and the secondary valving member 50 are opened to facilitate flushing of the main and secondary valving members 50 and 55 and the communicating openings 39 and the discharge outlet opening 49. The outlet valve 144 may also be operated during the flushing cycle to facilitate flushing of the outlet valve 144 and also for draining residual flushing liquid from the milk sample reservoir 135 into the main outlet pipe 36. During a flushing cycle, a collection jar 149 is provided on the receiving spigot 150. It is envisaged that in certain cases the main and secondary valving members may be alternately opened and closed after a predetermined time period or time periods to facilitate alternate flushing of the buffer and washing chambers.

While a particular shape and construction of main housing has been described, any other suitable shape and construction of main housing may be provided. It will be appreciated that other suitable main and secondary valve means may be provided, and needless to say, other suitable first and second communicating means and discharge outlet means may be provided. Needless to say, any other suitable shape and construction of weighing container may be provided.

It will also be appreciated that other suitable agitating means may be provided for agitating milk samples in the milk sample reservoir, and needless to say, while it is preferable, it is not essential that an agitating means be provided. It is also envisaged in certain cases that the meter may be provided without sample means, and it will of course be appreciated that where sampling means is provided, other suitable sampling means may be used.

While in the embodiment of the invention described, each discrete quantity of milk weighed in the weighing container is approximately 500 grammes, it will of course be appreciated that other suitable sizes of discrete quantities may be weighed. For example, in seasons where milk tends to froth excessively, it is envisaged that the weight of each discrete quantity will be reduced to approximately 300 grammes or even less. Needless to say, the weighing container may be sized to weigh discrete quantities of any desired weight. While the settling period has been described as being one second, the settling period may be set to be any desired value. However, in general, it is believed preferable that a settling period in the range of one-half second to three seconds is desirable. While the discharge time period has been described as being two seconds, this will be a function of the size of each discrete quantity of milk in the weighing container, and also of the size of the discharge outlet. However, the discharge time period should be sufficient to allow complete emptying of the weighing container after each discrete quantity of milk has been weighed. In general, it is preferable that the discharge time period should not exceed three or four seconds, otherwise, the weighing cycle time will be unduly slow. In certain cases, it is envisaged that the main valve means may not be responsive to the weighing means, rather, the main valve means would be responsive to the timer for closing the main valve means after a predetermined time which would allow a discrete quantity of milk to be delivered into the weighing means. However, such an arrangement would not provide as efficient a meter as would be provided where the main valve means is responsive to the weighing means.

While the meter has been described as comprising a control circuit which includes a timer, the timer may be implemented in the microprocessor, and while the weight storing means has been described as being a store within the microprocessor, a separate random access memory may be provided in the control circuit associated with the microprocessor for cumulatively storing the discrete quantities of milk.

While the meter has been described for measuring the quantity by weight of milk flowing in a pipeline, it will be appreciated that the meter may be used for measuring quantity by weight of any liquid flowing in a pipeline or otherwise.

The capacity of the buffer chamber should be sufficient for accumulating milk flowing into the meter while a discrete quantity of milk is being weighed. Additionally, the capacity of the buffer chamber and the height of the communicating pipe should be such as to avoid the overflow of milk or milk froth from the buffer chamber into the weighing container 45.

While the second communicating means has been described as being a communicating pipe, any other suitable second communicating means may be provided for communicating the vacuum between the weighing chamber and the buffer chamber.

We claim:

1. A meter for measuring the quantity by weight of a flowing liquid, the meter (1) comprising:

a housing (7) defining a buffer chamber (24) for receiving and holding the liquid to be weighed, and a weighing chamber (15) within which the liquid is weighed, the weighing chamber (15) being located below the buffer chamber (24), a first communicating means (39) for communicating the buffer chamber (24) and the weighing chamber (15) for accommodating liquid flow under gravity from the buffer chamber (24) to the weighing chamber (15), a main inlet means (35) being provided into the buffer chamber (24) for the liquid, a main outlet means (36) being provided from the weighing chamber (15) for delivering weighed liquid therefrom, a weighing means (45,46) for sequentially weighing discrete quantities of the liquid, the weighing means (45,46) being located in the weighing chamber (15) for receiving the liquid from the first communicating means (39), a discharge outlet means (49) from the weighing means (45,46) for delivering the weighed discrete quantities of the liquid from the weighing means (45,46) into the weighing chamber (15), a main valve means (40) co-operating with the first communicating means (39) for selectively closing the first communicating means (39) for isolating the weighing chamber (15) from the buffer chamber (24) after each discrete quantity of liquid has been delivered into the weighing means (45,46), a secondary valve means (50) co-operating with the discharge outlet means (49) for closing the discharge outlet means (49) and for selectively opening the discharge outlet means (49) after each discrete quantity of the liquid has been weighed in the weighing means (45,46), a sampling means (140) for collecting samples of the liquid, the sampling means (140) being located in the weighing chamber (15) beneath the discharge outlet means (49) of the weighing means (45,46) for collecting a liquid sample from the liquid being discharged from the weighing means (45,46) each time a weighed discrete quantity of the liquid is discharged from the weighing means (45,46), and a liquid sample storing means (135) communicating with the sampling means (140) for storing the liquid samples received from the sampling means (140).

2. A meter as claimed in claim 1 characterized in that the main valve means (40) is responsive to the weighing means (45,46) for closing the first communicating means (39) on the weighing means (45,46) determining that the approximate weight of the liquid in the weighing means (45,46) is equal to a predetermined weight, and the secondary valve means (50) is responsive to the weighing means (45,46) for opening the discharge outlet means (49) on the weighing means (45,46) having determined a substantially steady state weight of each discrete quantity of liquid in the weighing means (45,46).

3. A meter as claimed in claim 1 characterized in that the main valve means (40) is responsive to the secondary valve means (50) for opening the first communicating means (39) on the secondary valve means (50) having closed the discharge outlet means (49).

4. A meter as claimed in claim 1 characterized in that the meter (1) comprises a timing means (182).

5. A meter as claimed in claim 4 characterized in that the secondary valve means (50) is responsive to the timing means (182) for closing the discharge outlet means (49) on the timing means (182) having timed a predetermined discharge time period after the secondary valve means (50) has opened the discharge outlet means (49), and the main valve means (40) is responsive to the timing means (182) for opening the first communicating means (39) on the timing means (182) having timed a predetermined delay time period after the secondary valve means (50) has closed the discharge outlet means (49).

6. A meter as claimed in claim 4 characterized in that the weighing means (45,46) is responsive to the timing means (182) for determining the steady state weight of each discrete quantity of liquid in the weighing means (45,46) on the timing means (182) having timed a predetermined settling time period after the weighing means (45,46) has determined the approximate weight of liquid in the weighing means (45,46) being equal to the predetermined weight.

7. A meter as claimed in claim 1 characterised in that the weighing means (45,46) comprises a weighing container (45) defining a hollow interior region (43) for receiving the liquid through an open mouth (44), and for holding the liquid during weighing, the weighing container (45) being mounted on the housing (7) by a load cell (46) for weighing the liquid.

8. A meter as claimed in claim 7 characterized in that the load cell (46) comprises a shear beam load cell (46) which is mounted horizontally and externally of the housing (7), and a substantially horizontal carrier shaft (58) extends centrally from the load cell (46) through a side wall (47) of the housing (7) and is sealably engaged therein for carrying the weighing container (45).

9. A meter as claimed in claim 1 characterized in that the main valve means (40) comprises a main valving member (40) co-operating with the first communicating means (39) and being movable between an open position with the buffer chamber (24) and the weighing means (45,46) communicating and a closed position isolating the buffer chamber (24) from the weighing means (45,46), and a main actuating means (42) is provided for moving the main valving member (40) between the closed position and the open position, and the main actuating means (42) comprising a vacuum operated main diaphragm actuator (86,88), the main diaphragm actuator (86,88) being arranged for urging the main valving member (40) into the open position under vacuum, and a main biasing means (90) is provided for urging the main valving member (40) into the closed position.

10. A meter as claimed in claim 1 characterized in that the secondary valve means (50) comprises a secondary valving member (50) co-operating with the discharge outlet means (49), the secondary valving member (50) being movable between an open position with the discharge outlet means (49) open to a closed position with the discharge outlet means (49) closed, and a secondary actuating means (110) is provided for moving the secondary valving member (50) between the open and closed positions, and an operating member (107) operably connects the secondary actuating means (110) with the secondary valving member (50), the operating member (107) being disengagable with the secondary valving member (50) on the secondary valving member (50) being in the closed position, the secondary actuating means (110) comprising a vacuum operated secondary diaphragm actuator (112,115), the vacuum operated secondary diaphragm actuator (112,115) being arranged for operating the secondary valving member (50) into the closed position on a vacuum being applied, and a first secondary biasing means (105) is provided for urging the secondary valving member (50) into the closed position, and a second secondary biasing means (118) is provided for urging the secondary valving member (50) into the open position, and a baffle means (172) is provided in the first communicating means (39) for minimizing the effect of the liquid flowing into the weighing means (45,46) on the weighing means (45,46).

11. A meter as claimed in claim 1 characterized in that a control means (76) is provided for controlling the operation of the meter (1), the control means (76) comprising a monitoring means (181) for reading the output of the weighing means (45,46), a weight storing means (181) for cumulatively storing the steady state weight of the discrete quantities of liquid read by the monitoring means (181), the control means (76) also comprising the timing means (182), and the activating means (122,123) for activating the operation of the main and secondary valve means (40,50), the activating means (122,123) comprising respective main and secondary solenoid valves (122,123) for applying a vacuum to the respective main and secondary actuating means (42, 110).

12. A meter as claimed in claim 1 characterized in that a second communicating means (175) is provided for communicating the buffer chamber (24) with the weighing means (45,46) for maintaining the buffer chamber (24) and weighing means (45,46) at substantially the same pressure, the second communicating means (175) being located to avoid flow of liquid through the second communicating means (175) from the buffer chamber (24) to the weighing means (45,46) during normal operation of the meter (1).

13. A meter as claimed in claim 1 characterized in that the meter (1) is adapted for connecting into a pipeline (2) in which the liquid is flowing so that all the liquid flowing in the pipeline (2) flows through the meter (1), the main inlet means (35) being adapted for connecting to an upstream portion (3) of the pipeline (2), and the main outlet means (36) being adapted for connecting into a downstream portion (4) of the pipeline (2), the main housing (7) being airtight for maintaining a vacuum applied to the pipeline (2) and for maintaining the said vacuum in the housing (7).

14. A meter as claimed in claim 1 characterized in that the meter (1) is suitable for connecting into a milk pipeline (2) delivering milk from a milking cluster to a milk holding vacuum jar, the meter (1) being suitable for measuring the quantity of milk by weight flowing in the pipeline (2).

15. A meter as claimed in claim 1 characterized in that the liquid sample storing means (135) is located in the weighing chamber.

16. A meter as claimed in claim 1 characterized in that an overflow means (143) is provided from the liquid sample storing means (135) for delivering an overflow of liquid samples to the main outlet means (36).

17. A meter as claimed in claim 1 characterized in that an agitating means (145) is provided for agitating the liquid samples in the liquid sample storing means (135), the agitating means (145) being operable on movement of the secondary valve means (50).

18. A meter as claimed in claim 1 characterized in that a receiving means (150) for releasably receiving a collecting vessel (109) for collecting liquid samples is provided, the receiving means (150) communicating with the liquid sample storing means (135) through a secondary outlet means (154) from the liquid sample storing means (135).

19. A meter as claimed in claim 18 characterized in that an outlet valve means (144) is disposed between the secondary outlet means (154) and the receiving means (150) for selectively communicating the receiving means (150) with the secondary outlet means (154) for delivering liquid samples from the liquid sample storing means (135) to a collecting vessel (149) located on the receiving means (150).

20. A meter as claimed in claim 19 characterized in that the outlet valve means (144) selectively communicates the liquid sample storing means (135) with the main outlet means (36) for discharging liquid samples from the liquid sample storing means (135) to the main outlet means (36).

21. A meter as claimed in claim 19 characterized in that the outlet valve means (144) is a three position valve means (144) having a first position in which the receiving means (150) is connected to the secondary outlet means (154) and the main outlet means (36) for applying a vacuum on the receiving means (150) for drawing liquid samples from the liquid sample storing means (135) into a collecting vessel (149) mounted on the receiving means (150), a second position in which the secondary outlet means (154) is connected to the main outlet means (36) for drawing liquid samples into the main outlet means (36), and a third position in which the secondary outlet means (154) and the main outlet means (36) are respectfully closed and isolated from the receiving means (150) and from each other.

22. A method for measuring the quantity by weight of a flowing liquid, the method comprising the steps of feeding the liquid through a main inlet means (35) into a buffer chamber (24) formed in a housing (7) which also forms a weighing chamber (15) which is located beneath the buffer chamber (24), sequentially delivering discrete quantities of the liquid from the buffer chamber (24) under gravity through a first communicating means (39) into a weighing means (45,46) which is located in the weighing chamber (15) by opening a main valve means (40) located in the first communicating means (39), isolating the weighing means (45,46) from the buffer chamber (24) after each discrete quantity of liquid has been delivered into the weighing means (45,46) by closing the main valve means (40), sequentially determining the weight of the discrete quantities of liquid in the weighing means (45,46), discharging the weighed discrete quantities of liquid from the weighing means (45,46) into the weighing chamber (15) through a discharge outlet means (49) from the weighing means (45,46) by opening a secondary valve means (50) which cooperates with the discharge outlet means (49) for closing the discharge outlet means (49) during weighing of each discrete quantity of the liquid for subsequent delivery of the weighed liquid through a main outlet means (36) from the weighing chamber (15), taking a liquid sample of each weighed discrete quantity of liquid as the discrete quantity of liquid is being discharged from the weighing means (45,46) by a sampling means (140) located beneath the discharge outlet means (49) from the weighing means (45,46), and storing the liquid samples in a liquid sample storing means (135) which communicates with the sampling means (140) for subsequent collection.

23. A method as claimed in claim 22 characterized in that the weighing means (45,46) is isolated from the buffer chamber (24) on the weighing means (45,46) having determined that the approximate weight of liquid in the weighing means (45,46) is equal to a predetermined weight, and the weighing means (45,46) determines a substantially steady state weight of each discrete quantity of liquid.

* * * * *